Figure 1:
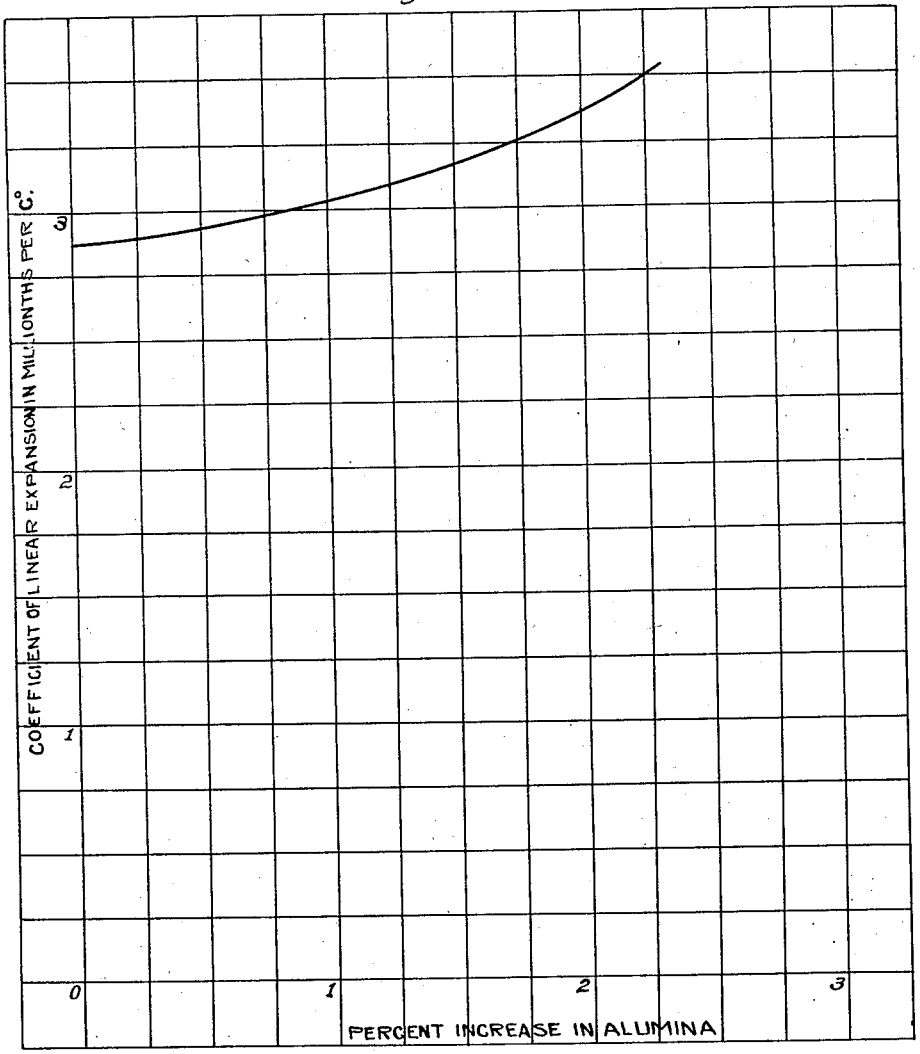

July 18, 1933.  C. E. WOODDELL  1,918,312

BORO-SILICATE BONDED ALUMINOUS ABRASIVE

Filed Oct. 23, 1929

INVENTOR
Charles E. Wooddell
BY
ATTORNEYS

Patented July 18, 1933

1,918,312

UNITED STATES PATENT OFFICE

CHARLES E. WOODDELL, OF NIAGARA FALLS, NEW YORK, ASSIGNOR TO THE CARBORUNDUM COMPANY, OF NIAGARA FALLS, NEW YORK, A CORPORATION OF PENNSYLVANIA

BORO-SILICATE BONDED ALUMINOUS ABRASIVE

Application filed October 23, 1929. Serial No. 401,951.

This invention relates to methods of improving the cutting qualities of abrasive articles by a choice in the character of the bond. The object of the invention is to improve the qualities of abrasive articles, particularly those in which the abrasive is alumina, by employing as a bond a borosilicate glass.

The drawing shows graphically the effect of the absorption by borosilicate glass of alumina on the coefficient of linear expansion.

Borosilicate glasses of the type characterized by high silica and low alkali content, together with a low coefficient of expansion, have many physical properties which make them desirable for use as abrasive bonds. However, previous efforts to use the borosilicate glasses of this type have not been successful, principally owing to the type of grain employed. The efforts have been largely confined to the ordinary varieties of aluminous grain which contain a considerable quantity of surface impurities, particularly iron and titanium, in varying degrees of oxidation. When a sufficient percentage of the glass is used to give the wheel the desired hardness and toughness, there is apparently a reaction during the curing process between the bond and the grain which produces a deleterious effect on the bond itself, and also causes bloating and bubbling. The physical properties of the resulting abrasive article are both variable and unsatisfactory.

I have found that by using essentially pure alumina, these difficulties do not occur. When the pure grain (for example, 98-99% $Al_2O_3$) is used in combination with a borosilicate glass high in silica (for example 70-90%) comparatively high in boric oxide (for example 10-20%) and low in alkali and alkaline earths (for example 0-10%), I have found that the difficulties usually encountered in the manufacture of bonded abrasive articles are greatly minimized, and that the resultant product possesses unusual toughness and strength, combined with cool and free cutting properties greatly in excess of those possessed by the ordinary ceramically bonded abrasive wheel.

Although I have successfully overcome the difficulties encountered with this type of borosilicate glass bond by the use of a pure grade of alumina, I have also found it possible to render the impurities of the ordinary varieties of aluminous grain inactive by roasting. When the grain thus treated is bonded with a borosilicate glass of the type described, it behaves in effect as if it were pure alumina. I believe that the difficulties encountered with the impure untreated grain are due to the impurities which are not in their highest state of oxidation, although the actual mechanism of the reactions involved are not of consequence in relation to my invention. In addition to iron and titanium, the impure grain may contain sulphur, sulphides and carbides, which have a deleterious action on the bond. These impurities are oxidized during the process of roasting. I have found that when oxidizable impurities are absent, as in the case of both pure alumina and roasted grain, the difficulties which have prevented the successful use of the bonds which I have described are eliminated.

The roasting is carried out by placing the grain in saggers and heating in an oxidizing atmosphere, the temperature and duration of the process depending somewhat upon the percentage of bond to be used in the abrasive article. For low percentages of bond, roasting to 900° C. is usually sufficient; for medium and high percentages a higher temperature (for example 1200-1400° C.) is usually necessary.

One of the characteristics of the bonds I employ is that they are essentially free from iron. I have found that iron has a deleterious effect when present in a vitrified bond and many serious variations in the strength of the product have been traced to this element. The degree of oxidation of the iron in the usual vitrified bond varies with fluctuating kiln atmosphere, and such variations are liable to cause boiling or blistering. That the iron is undesirable has been shown by the fact that addition of iron oxide to a comparatively iron-free bond (as for example, the borosilicate bonds here described) reduces the strength of the bonded abrasive product materially.

The use of borosilicate glass bond of the type described posseses many advantages from the manufacturing standpoint, especially in comparison with the ordinary ceramic bonds in common use. The chief advantage lies in the fact that it retains a high viscosity at a temperature where it completely wets the grain. At 1100° C. it is sufficiently viscous to prevent slumping and distortion during the process of curing, but at the same time the wetting of the grain is much more complete than is usually the case with vitrified bonds. The wetting takes place without the evolution of gas, so that bubbling or bloating, which is a serious difficulty in the manufacture of bonded abrasives, is greatly minimized or prevented.

My new product possesses several physical characteristics which distinguish it from the ordinary abrasive wheel. Among these are the (1) hardness and flint-like fracture of the bond, (2) coefficient of expansion of the bond, which may differ greatly from that of the abrasive grain, (3) partial absorption of grain by the bond to give a surrounding layer having a coefficient of expansion intermediary between that of the bond and the grain, (4) high porosity, and (5) a characteristic microscopic structure.

At ordinary temperatures the bond is as hard as quartz, and possesses a property which is very unusual for a glass, in that when it is subjected to mechanical strain and repeated impact, it tends to break off in small flakes rather than shatter throughout the entire mass. When used as an abrasive bond it tends to chip off from the surface of the abrasive, rather than shatter through or around the grains.

The coefficient of linear expansion of aluminous abrasives grain is usually between 7 and $8 \times 10^{-6}$ per degree C., whereas with the bonds I employ, the coefficient of expansion may be as low as one third of this value. In previous attempts to employ glass as an abrasive bond, it has been thought necessary or desirable to regulate the coefficient of expansion so that it would be approximately equal to that of the abrasive grain. However, if cool cutting qualities are to be obtained, the surface actually engaged in cutting must be kept comparatively free from bond, as well as from grain which no longer possesses free cutting properties. I have found that the regulating of the coefficient of expansion so as to keep it somewhat lower than that of the abrasive grain is an effective aid in accomplishing this result. As the heat expands the grains of the active abrasive surface the greater expansion of the grain in comparison with that of the bond cracks or chips the film of bond adhering to the abrading surface until a fresh grinding surface is presented. Under extreme temperature conditions, as will obtain when the grain is no longer free cutting, the grain will be freed from the bond because of this differential expansion. Thus the wheel is practically self-dressing, and the grinding action is continued by the cooler surface underneath. This action takes place without appreciably weakening or shattering the remainder of the abrasive article, since the bond is sufficiently tough to withstand the milder thermal shocks within the body of the wheel. The latter property is increased by a gradual rather than an abrupt change in the coefficient of expansion at the interface between the grain and the bond, due to absorption of alumina by the bond.

When borosilicate bonds are used with pure alumina, the bond partially absorbs alumina from the grain or reacts with it, and as the percentage of bond increases, an increasing amount of alumina is absorbed from the grain into the bond, until the amount absorbed attains a maximum. This fact has been confirmed by a chemical analysis of the glass before and after its use as a bonding agent. The effect of the absorption of the alumina is to modify the characteristics of the bond in the immediate vicinity of the abrasive grain, particularly with reference to the coefficient of expansion, and a continual gradation is effected between a bond having a low coefficient of expansion, an intermediary or reaction product having a coefficient of expansion between that of the bond and the grain, and the pure grain, the latter having a comparatively high expansion coefficient. The effect of alumina in modifying the coefficient of expansion of the bond has been verified by actual measurements the results of which are shown in the drawing, which clearly indicates the increase in the coefficient of expansion of the bond with the increase in the percentage of alumina absorbed thereby.

I have found that the self-dressing properties may be attained by employing a bond differing in its coefficient of expansion from that of the grain and it is within the scope of my invention to employ a bond having a somewhat greater coefficient of expansion than that of the abrasive. The requirements for a bond in this type of wheel are a close union with the grain (as can be produced by reaction or absorption) combined with sufficient toughness that the grain will be freed from the bond only under the more extreme temperature conditions, as obtain when the grain of the actual grinding surface is no longer free cutting.

With the bonds I have described, the article shows a fairly high porosity, which exceeds that of the ordinary ceramically bonded abrasive wheel by about five percent. Microscopic examination shows that there is apparently an attraction between the grain and the bond, and that the grains are connected by "bridges" of bond between which there are gaps. It is believed that this unusual wetting ability by a bond which is so highly viscous may be due in part to a lowering of the viscosity in the immediate vicinity of the grain by the absorption of alumina by the bond.

In making my abrasive articles, I prefer to use a material which has been previously fritted into a homogeneous glass. After fritting, the bond is crushed and ground, preferably through 90 mesh. It is then mixed with pure alumina or properly roasted grain, the proportion of bond depending upon the toughness desired in the resultant product. As an example, 15 percent of bond may be used. From 1 to 2 percent dry glutin or other suitable temporary binder is added, and sufficient water (usually about 1½ percent) is added to give the proper consistency for molding and pressing. Any method of molding and pressing may be used; the pressure should be from 1000 to 3000 pounds per square inch. After pressing, the article is either oven dried or air dried and then placed in a sagger, covered with sand or other refractory material, and fired to approximately 1100° C. The time for bringing the articles to temperature may vary considerably but in most cases the temperature is raised from 50 to 100° C. per hour. Since the bond has been previously vitrified, the articles need only be brought to uniform temperature of 1100° C. throughout, although the time to bring about this uniformity in temperature varies considerably with the size of the article. The total time of firing usually need not exceed from 12 to 24 hours. This is in great contrast to the usual procedure in making ceramically bonded wheels, where combined water must be driven off very slowly, and where shrinkage must take place very gradually before vitrification is complete. The latter or ordinary process usually takes from eight to fourteen days. With a previously fritted glass all chemical action is complete except for the action of the bond on the grain, and in addition to the short time of firing, the danger of boiling and blistering is greatly decreased. After firing the articles may be cooled somewhat more rapidly than the rate employed in heating, except that the cooling should be slow through the annealing range of the glass.

When I employ impure grain, I crush or mill the crude alumina pig to suitable grit size and wash the grain with water. It may or may not be given a magnetic treatment to remove the ferro-silicon prior to roasting. For low percentages of bond I may employ a low temperature roast of approximately 900° C. for four or five hours. For higher percentages of bond (for example, 10–20 percent) I briquette the grain and roast it in the ordinary kiln used for firing abrasive wheels, employing a strongly oxidizing atmosphere. The complete time of firing, from a cold start until the article is removed from the kiln, is usually twelve to sixteen days. The briquette is then crushed or pan-milled, washed with water, and graded. The grain may be given a magnetic treatment after roasting in order to assure absolute removal of the ferro-silicon.

The grain is then mixed with the bond, a temporary binder added, and the abrasive articles molded, pressed and fired as described above.

The following are specific examples of the bonds I may employ, together with their coefficients of expansion:

| Approximate composition in percent | | | Coefficient of linear expansion |
|---|---|---|---|
| $SiO_2$ | $B_2O_3$ | $Na_2O-K_2O$ | |
| 70–75 | 24–27 | 1 | $2.7 \times 10^{-6}$ per degree C. |
| 80 | 12 | 4 | 3.2 |
| 70–75 | 20–25 | 5 | 3.7 |
| 70–75 | 19–24 | 6 | 4.3 |
| 70–75 | 18–23 | 7 | 4.8 |
| 70–75 | 15–20 | 10 | 6.1 |

Other oxides as, for example, alkaline earths or alumina, may also be present, although the amount is usually kept low.

Although I may add glutin as a temporary binder, I have found that the carbonaceous matter burns out readily, which is not the case with the usual clay bonds, especially when fluxes are added to reduce the softening point. For this reason, and because of the high viscosity of the bond at the curing temperature, larger articles can be made by my combination of bond and grain than have hitherto been possible. In ordinary practice the maximum thickness for a bonded abrasive article is considered to be from twelve to fourteen inches, whereas by my process I have produced articles considerably in excess of this thickness, as for example, eighteen inches. The latter figure does not represent the limit of thickness which can be obtained.

I claim:

1. A bonded abrasive article in which the bond is a borosilicate glass having a thermal coefficient of less than $4 \times 10^{-6}$ per degree centigrade, and in which the abrasive is an aluminous grain, said grain being essentially free from oxidizable surface impurities.

2. A bonded abrasive article comprising abrasive grains and a boro-silicate glass bond in which the coefficient of expansion of the bond differs from that of the abrasive grain by more than 40 percent.

3. A bonded abrasive article comprising abrasive grains and a bond comprised principally of a boro-silicate glass in which the coefficient of expansion of the bond is less than that of the grain, and less than $4 \times 10^{-6}$ per degree centigrade.

4. A bonded abrasive article comprising abrasive grains and a bond consisting principally of a boro-silicate glass in which the coefficient of expansion of the bond is less than that of the grain by substantially more than 20 percent.

CHARLES E. WOODDELL.